(12) United States Patent
Kim

(10) Patent No.: US 12,005,908 B2
(45) Date of Patent: Jun. 11, 2024

(54) APPARATUS AND METHOD FOR GENERATING LINK FOR EACH LANE

(71) Applicants: HYUNDAI MOTOR COMPANY, Seoul (KR); Kia Corporation, Seoul (KR)

(72) Inventor: Nam Hyuk Kim, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 258 days.

(21) Appl. No.: 17/743,046

(22) Filed: May 12, 2022

(65) Prior Publication Data
US 2023/0008288 A1 Jan. 12, 2023

(30) Foreign Application Priority Data
Jul. 8, 2021 (KR) .................. 10-2021-0089975

(51) Int. Cl.
*B60W 40/105* (2012.01)
(52) U.S. Cl.
CPC ....... *B60W 40/105* (2013.01); *B60W 2552/53* (2020.02); *B60W 2554/4049* (2020.02)

(58) Field of Classification Search
CPC ....... B60W 40/00; B60W 40/02; B60W 40/06; B60W 40/72; B60W 40/105; B60W 40/107; B60W 40/109
See application file for complete search history.

(56) References Cited

U.S. PATENT DOCUMENTS

| | | | |
|---|---|---|---|
| 2006/0106531 A1* | 5/2006 | Nagase | G08G 1/096775 701/532 |
| 2011/0224898 A1* | 9/2011 | Scofield | G08G 1/0104 701/532 |
| 2022/0003570 A1* | 1/2022 | Ukai | G09B 29/006 |
| 2022/0221302 A1* | 7/2022 | Chikamori | G01C 21/3469 |
| 2022/0314979 A1* | 10/2022 | Oh | B60W 30/0956 |
| 2024/0077332 A1* | 3/2024 | Lee | G01C 21/3889 |

* cited by examiner

*Primary Examiner* — John Kwon
(74) *Attorney, Agent, or Firm* — MORGAN, LEWIS & BOCKIUS LLP

(57) ABSTRACT

Disclosed are an apparatus and method for generating a link for each lane when there is a plurality of exit lanes. The apparatus may acquire information about a speed of a probe vehicle from the probe vehicle, and determine a section for generating a divided link along a lane, based on a speed difference of the probe vehicle in an exit direction. Accordingly, it is possible to improve the accuracy and reliability of the speed of each lane.

20 Claims, 6 Drawing Sheets

| TIME | | DIRECTION | | POINT | | | from link | | | | | | to link | | |
|---|---|---|---|---|---|---|---|---|---|---|---|---|---|---|---|
| | | ACHEON IC -><br>GAYANG BRIDGE JUNCTION | | NORTH END OF SEONGSU BRIDGE | | | 2046547 (133m) | | | | | | 2053738(MAIN LANE)<br>2053898(EXIT) | | |
| | | | | | | | | | | | | | | UNIT:km/h | |
| | AVERAGE<br>SPEED | from<br>(133m) | q1<br>(311m) | q2<br>(646m) | q3<br>(1455m) | q4<br>(1604m) | q5<br>(1652m) | q6<br>(1905m) | q7<br>(2030m) | q8<br>(2461m) | q9<br>(4081m) | q10<br>(4398m) |
| ... | | | | | | | | | | | | |
| 20.2/25<br>08:45 | MAIN LANE | 43.48 | 48.31 | 57.68 | 48.45 | 48.24 | 40.50 | 58.63 | 53.99 | 45.05 | 25.93 | 10.78 |
| | EXIT | 25.24 | 12.90 | 41.33 | 33.55 | 23.61 | | | 52.29 | 35.70 | 22.58 | 10.20 |
| | SPEED<br>DIFFERENCE | 18.23 | 35.40 | 16.35 | 14.91 | 24.64 | | | 1.70 | 9.35 | 3.35 | 0.58 |
| ... | | | | | | | | | | | | |

▨ LINK INCLUDED IN SET WITH SPEED LIMITATION OF 60 KM/H, 5 SAMPLES OR MORE, OCCURRENCE OF SPEED DIFFERENCE OF 10 KM/H OR MORE    ▧ FILTERED CELL

CASE OF SPEED LIMITATION OF 60 KM/H, 5 SAMPLES OR MORE, OCCURRENCE OF SPEED DIFFERENCE OF 10 KM/H

| | | | | | | | | TOTAL |
|---|---|---|---|---|---|---|---|---|
| Queue link NUMBER | 5 | 4 | 3 | 2 | 1 | 0 | | |
| Queue link LENGTH | 1604m | 1455m | 646m | 311m | 133m | 0m | | |
| NUMBER OF SAMPLES | 2 | 11 | 57 | 97 | 127 | 3162 | | 3456 |

Fig.3

| DIRECTION | POINT | from link | | | | | | | | to link | |
|---|---|---|---|---|---|---|---|---|---|---|---|
| GAEHWA IC → GANGIL IC | SOUTH END OF OLYMPIC BRIDGE | 3808936 (268 m) | | | | | | | | 3808935(MAIN LANE)<br>4028900(EXIT) | |

UNIT: km/h

| TIME | | from<br>(268m) | q1<br>(440m) | q2<br>(559m) | q3<br>(783m) | q3<br>(872m) | q5<br>(926m) | q6<br>(1224m) | q7<br>(1750m) | q8<br>(2292m) | q9<br>(2670m) | q10<br>(3063m) |
|---|---|---|---|---|---|---|---|---|---|---|---|---|
| ... | | | | | | | | | | | | |
| 20.2/24<br>10:50 | MAIN LANE | 56.52 | 54.07 | 57.98 | | | 57.14 | | | | | |
| | EXIT | 39.90 | 41.85 | 54.05 | 55.98 | | | | | | | |
| | SPEED<br>DIFFERENCE | 16.62 | 12.22 | 3.93 | | | | | | | | |
| ... | | | | | | | | | | | | |

▨ LINK INCLUDED IN SET WITH SPEED DIFFERENCE OF 10 KM/H OR MORE    ▦ FILTERED CELL

CASE OF SPEED LIMITATION OF 60 KM/H, 5 SAMPLES OR MORE, OCCURRENCE OF SPEED DIFFERENCE OF 10 KM/H

| | | | | | | | | | | | TOTAL |
|---|---|---|---|---|---|---|---|---|---|---|---|
| Queue link NUMBER | 5 | 4 | 3 | 2 | 1 | 0 | | | | | |
| Queue link LENGTH | 872m | 783m | 559m | 440m | 268m | 0m | | | | | |
| NUMBER OF SAMPLES | 0 | 0 | 0 | 4 | 11 | 3442 | | | | | 3456 |

Fig.4

APPARATUS AND METHOD FOR GENERATING LINK FOR EACH LANE

CROSS-REFERENCE TO RELATED APPLICATION

This application claims the benefit of priority to Korean Patent Application No. 10-2021-0089975, filed on Jul. 8, 2021, with the Korean Intellectual Property Office, the entire contents of which are incorporated herein by reference.

TECHNICAL FIELD

The present disclosure relates to an apparatus and method for generating a link for each lane, and more particularly, to an apparatus and method for generating a link for each lane when there are a plurality of exit lanes.

BACKGROUND

In a method of collecting traffic information of a road through a probe vehicle, a road section for vehicles traveling in one direction may be defined as a road link, and an average speed of vehicles passing through the road link may be defined as a traffic speed. Road links may be broadly classified into lane-specific links divided according to lanes and non-divided general links. When the speed for the general link is collected through the probe vehicle, the average speed of the corresponding section is calculated regardless of the vehicle's exit in a section that enters a plurality of exit lanes. Meanwhile, when the speed of the link for each lane is collected through the probe vehicle, the average speed according to the vehicle's exit lanes in a section entering a plurality of exit lanes may be calculated, thereby improving the reliability of the calculated speed.

The conventional link for each lane is generated under the same condition (e.g., a link for each lane from an intersection or interchange (IC) to the next intersection or IC is generated) in all sections of the road. Accordingly, because the shape of the road is different for each intersection, the link for each lane does not reflect the shape of the corresponding intersection. Therefore, there is a need to develop a technique for solving the above problems.

SUMMARY

The present disclosure has been made to solve the above-mentioned problems occurring in the prior art while maintaining the advantages achieved by the prior art.

An aspect of the present disclosure provides an apparatus and method for generating a link for each lane when there is a plurality of exit lanes.

Another aspect of the present disclosure provides an apparatus and method for generating a link for each lane capable of improving the accuracy and reliability of the speed of each lane.

Still another aspect of the present disclosure provides an apparatus and method for generating a link for each lane capable of solving a problem that the speed of each lane cannot be properly reflected when the conventional link for each lane is shorter than the actual vehicle queue.

Still another aspect of the present disclosure provides an apparatus and method for generating a link for each lane capable of improving the quality of the expected arrival time of a destination by improving the accuracy and reliability of vehicle speed collected on the road.

Still another aspect of the present disclosure provides an apparatus and method for generating a link for each lane capable of collectively and automatically generating a link for each lane reflecting a road shape.

The technical problems to be solved by the presently disclosed concept are not limited to the aforementioned problems, and any other technical problems not mentioned herein will be clearly understood from the following description by those skilled in the art to which the present disclosure pertains.

According to an aspect of the present disclosure, an apparatus for generating a link for each lane may include an information acquisition device that acquires information about a speed of a probe vehicle from the probe vehicle, and a processor that determines a section for generating a divided link along a lane, based on a speed difference of the probe vehicle in an exit direction.

According to an embodiment, the information acquisition device may acquire an identity (ID) of the probe vehicle, and the processor may classify the exit direction of the probe vehicle based on the ID of the probe vehicle.

According to an embodiment, the processor may determine the section for generating the divided link according to the lane based on whether the speed difference of the probe vehicle in the exit direction exceeds a preset threshold value.

According to an embodiment, the processor may determine a lane section for generating a link for each lane in consideration of whether a number of acquired information about the speed of the probe vehicle exceeds a preset threshold number.

According to an embodiment, the processor may determine a lane section for generating a link for each lane based on whether the speed of the probe vehicle is less than a preset threshold speed.

According to an embodiment, the processor may determine a section included in the section for generating the divided link according to the lane among one or more candidate link sections sequentially connected in a direction opposite a direction of advancing to an exit lane based on a point that enters into a plurality of exit lanes, based on the speed difference of the probe vehicle in the exit direction with respect to each of the candidate link sections.

According to an embodiment, the processor may filter candidate link sections, in which a number of acquired information about the speed of the probe vehicle in the exit direction does not exceed a preset threshold number, from the one or more candidate link sections.

According to an embodiment, the processor may filter candidate link sections in which an average speed of the probe vehicle in all exit directions is greater than or equal to a preset threshold speed, from the one or more candidate link sections.

According to an embodiment, the processor may determine a section included in the section for generating the divided link along the lane based on whether a difference in an average speed of the probe vehicle in the exit direction among the one or more candidate link sections exceeds a preset threshold value.

According to an embodiment, the processor may allow a candidate link section, in which a difference in average speed of the probe vehicle in the exit direction among the one or more candidate link sections sequentially from a point at which a plurality of exit routes advance exceeds a preset threshold value, to be included in the section for generating the divided link along the lane.

According to another aspect of the present disclosure, a method of generating a link for each lane includes acquiring, by an information acquisition device, information about a speed of a probe vehicle from the probe vehicle, and determining, by a processor, a section for generating a divided link along a lane based on a speed difference of the probe vehicle in an exit direction.

According to an embodiment, the method may further include acquiring, by the information acquisition device, an ID of the probe vehicle, and classifying, by the processor, the exit direction of the probe vehicle based on the ID of the probe vehicle.

According to an embodiment, the determining of the section by the processor may include determining, by the processor, the section for generating the divided link according to the lane based on whether the speed difference of the probe vehicle in the exit direction exceeds a preset threshold value.

According to an embodiment, the determining of the section by the processor may include determining, by the processor, a lane section for generating a link for each lane in consideration of whether a number of acquired information about the speed of the probe vehicle exceeds a preset threshold number.

According to an embodiment, the determining of the section by the processor may include determining, by the processor, a lane section for generating a link for each lane based on whether the speed of the probe vehicle is less than a preset threshold speed.

According to an embodiment, the determining of the section by the processor may include determining, by the processor, a section included in the section for generating the divided link according to the lane among one or more candidate link sections sequentially connected in a direction opposite a direction of advancing to an exit lane based on a point that enters into a plurality of exit lanes, based on the speed difference of the probe vehicle in the exit direction with respect to each of the candidate link sections.

According to an embodiment, the determining of the section by the processor may include filtering, by the processor, the candidate link sections, in which a number of acquired information about the speed of the probe vehicle in the exit direction does not exceed a preset threshold number, from the one or more candidate link sections.

According to an embodiment, the determining of the section by the processor may include filtering, by the processor, the candidate link sections in which an average speed of the probe vehicle in all exit directions is greater than or equal to a preset threshold speed, from the one or more candidate link sections.

According to an embodiment, the determining of the section by the processor may include determining, by the processor, a section included in the section for generating the divided link along the lane based on whether a difference in an average speed of the probe vehicle in the exit direction among the one or more candidate link sections exceeds a preset threshold value.

According to an embodiment, the determining of the section by the processor may include allowing, by the processor, a candidate link section, in which a difference in average speed of the probe vehicle in the exit direction among the one or more candidate link sections sequentially from a point at which a plurality of exit routes advance exceeds a preset threshold value, to be included in the section for generating the divided link along the lane.

BRIEF DESCRIPTION OF THE DRAWINGS

The above and other objects, features and advantages of the present disclosure will be more apparent from the following detailed description taken in conjunction with the accompanying drawings:

FIG. 3 is a diagram illustrating an example in which an apparatus for generating a link for each lane according to an embodiment of the present disclosure determines a section in which to generate a link divided along a lane;

FIG. 4 is a diagram illustrating another example in which an apparatus for generating a link for each lane according to an embodiment of the present disclosure determines a section in which to generate a link divided along a lane;

DETAILED DESCRIPTION

Figure 1:
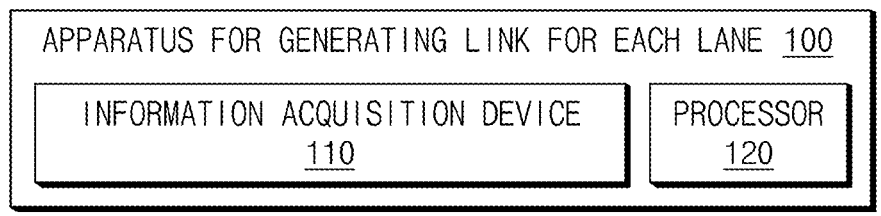
FIG. 1 is a block diagram illustrating an apparatus for generating a link for each lane according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 6.

FIG. 1 is a block diagram illustrating an apparatus for generating a link for each lane according to an embodiment of the present disclosure.

Referring to FIG. 1, an apparatus 100 for generating a link for each lane may include an information acquisition device 110 and a processor 120.

For example, the apparatus 100 for generating a link for each lane may be provided in a server that collects or manages traffic information using a node and a link, or may be implemented as a separate device separated from the server.

The information acquisition device 110 may acquire information about the speed of a probe vehicle from the probe vehicle.

For example, the information acquisition device 110 may acquire the ID of the probe vehicle.

For example, the information acquisition device 110 may communicate with the probe vehicle traveling on a road through wireless communication, and may receive information including the speed of the probe vehicle from the probe vehicle in real time or at a specific period.

For example, the information acquisition device 110 may receive information including the speed of the probe vehicle from the probe vehicle though wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

For example, the information acquisition device 110 is connected to the processor 120 through wireless or wired communication, and may directly or indirectly transmit at least one of the speed and the ID of the probe vehicle obtained from the probe vehicle to the processor 120.

The processor 120 may be electrically connected to the information acquisition device 110 and the like, and may electrically control each component. The processor 120 may be an electric circuit executing a command of software, thereby performing the process and calculation of various data to be described later.

The processor 120 may determine a section in which to generate a divided link along a lane based on a speed difference of the probe vehicle according to the exit direction.

As an example, the processor 120 may classify the exit direction of the probe vehicle based on the ID of the probe vehicle.

For example, the processor 120 may identify an exit lane along which the probe vehicle advances according to the ID of the probe vehicle at an intersection having exit lanes in two or more different directions, calculate the average speed of the probe vehicle advancing into the exit lane in the same exit direction, and determine a section in which to generate a divided link along a lane, based on a difference in average speed of the probe vehicle according to the exit direction.

For example, the processor 120 may determine a section in which to generate a divided link along a lane based on whether a speed difference of the probe vehicle in the exit direction exceeds a preset threshold value.

For example, the processor 120 may determine whether a difference in the average speed of the probe vehicle in the exit direction for an arbitrary section exceeds a preset threshold value, and may determine, as the section in which to generate the divided link along a lane, an arbitrary section in which the difference in the average speed of the probe vehicle exceeds the threshold value.

For example, the processor 120 may determine a lane section for generating a link for each lane in consideration of whether the number of pieces of obtained information on the speed of the probe vehicle exceeds a preset threshold number.

For example, the processor 120 may determine whether the number of pieces of the information on the speed of the probe vehicle acquired in an arbitrary section exceeds the preset threshold number.

For example, when the number of pieces of the information on the speed of the probe vehicle acquired in an arbitrary section does not exceed the preset threshold number, because the information may not have representativeness and reliability of the speed, the processor 120 may determine the lane section in which a link for each lane is to be generated by using only data when the number of pieces of acquired information on the speed of the probe vehicle exceeds the preset threshold number.

For example, the processor 120 may determine a lane section in which to generate a link for each lane based on whether the speed of the probe vehicle is less than a preset threshold speed.

For example, the processor 120 may determine whether the average speed of the probe vehicle in the exit direction in an arbitrary section is less than the preset threshold speed.

For example, when the average speed of the probe vehicle in all exit directions in an arbitrary section is not less than the preset threshold speed, because the corresponding section is not a congested section, the speed difference in the corresponding section may be due to reasons other than the difference in the exit direction. In this case, the processor 120 may use only data that correspond to an arbitrary section in which the average speed of the probe vehicle in at least one exit direction is less than the preset threshold speed, such that the processor 120 determines a lane section in which to generate a link for each lane.

For example, the processor 120 may determine a section including a section in which to generate the divided link along a lane among at least one candidate link section sequentially connected in the opposite direction to the exit direction based on the point at which the plurality of exit lanes advance, based on the difference in the speed of the probe vehicle in the exit direction with respect to each candidate link section.

For example, at least one candidate link section sequentially connected in the opposite direction to the exit direction based on the point at which the plurality of exit lanes advance may include a section corresponding to a preset existing link and may include a preset specific number of connected link sections.

Based on a point at which a plurality of exits advance, a link entering an exit lane may be defined as a 'from link'.

A link for a road section that is connected in a direction opposite the direction of advancing to the 'from link' and the exit lane, and for a road section running in the direction of a plurality of exit lanes may be defined as a queue link.

For example, at least one candidate link section sequentially connected in a direction opposite the direction of advancing to the exit lane may include sections corresponding to the from link and the queue link, based on the point at which the plurality of exit lanes advance.

For example, the processor 120 may calculate the average speed of the probe vehicle obtained in the exit direction for at least one candidate link section in real time or at a specific period.

For example, the processor 120 may filter a candidate link section in which the number of pieces of the information on the speed of the probe vehicle acquired in the exit direction does not exceed a preset threshold number among at least one candidate link section.

For example, the processor 120 may filter a candidate link section in which the number of pieces of the information on the speed of the probe vehicle acquired in the exit direction is less than five among at least one candidate link section.

In this case, the number of five is an arbitrarily set number for the purpose of illustration, and may actually be set to another number.

For example, because the speed may not have representativeness and reliability when the number of pieces of information on the speed of the probe vehicle acquired in the exit direction among at least one candidate link section does not exceed the preset threshold number, the processor 120 may use only data of the candidate link section in which the number of pieces of information on the speed of the probe vehicle acquired in the exit direction among at least one candidate link section exceeds the preset threshold number.

For example, the processor 120 may filter a candidate link section in which the average speed of the probe vehicle in all exit directions is equal to or greater than a preset threshold speed among at least one candidate link section.

For example, the processor 120 may filter a candidate link section in which the average speed of the probe vehicle in all exit directions is 60 km/h or more among at least one candidate link section.

In this case, the speed of 60 km/h is an arbitrarily set speed as an example, and may actually be set to another speed.

For example, when the average speed of the probe vehicle in all exit directions in at least one candidate link section is equal to or greater than the preset threshold speed, the section is not a congested section. Because the section is not a congested section, the speed difference in the corresponding section may be due to reasons other than the difference in the exit direction. The processor 120 may use only data of the candidate link section among at least one candidate link section in which the average speed of the probe vehicle in at least one exit directions is less than the preset threshold speed.

For example, the processor 120 may determine a section including a section in which to generate the divided link along a lane, based on whether a difference in the average speed of the probe vehicle in the exit direction among the at least one candidate link section exceeds the preset threshold speed.

For example, the processor 120 may filter a candidate link section in which the number of pieces of the information on the speed of the probe vehicle acquired in the exit direction is less than five among at least one candidate link section. After filtering a candidate link section in which the average speed of the probe vehicle in all exit directions among at least one candidate link section is equal to or greater than the preset threshold speed, the processor 120 may determine a section included in a section in which to generate a divided link along a lane based on whether the difference in the average speed of the probe vehicle in the exit direction for the remaining candidate link sections exceeds the preset threshold value.

For example, the processor 120 may determine a section included in a section in which to generate a divided link along a lane based on whether the difference in the average speed of the probe vehicle in the exit direction among at least one candidate link section exceeds 10 km/h.

In this case, the speed of 10 km/h is an arbitrarily set speed as an example, and may actually be set to another value.

For example, the processor 120 may determine a section connecting the candidate link section in which the difference in the average speed of the probe vehicle in the exit direction among at least one candidate link section exceeds the preset threshold value as a section in which to generate the divided link along a lane.

For example, the processor 120 may allow the candidate link section, in which the average speed of the probe vehicle in an exit direction among at least one candidate link section sequentially from the point at which the plurality of exit lanes advance exceeds the preset threshold value, to be included in the section in which to generate the divided link along a lane.

For example, the processor 120 may determine whether the difference in the average speed of the probe vehicle in the exit direction among the at least one candidate link section sequentially from the point at which the plurality of exit lanes advance exceeds the preset threshold value. Then, the processor 120 may set a section from the point at which the plurality of exit lanes advance to a preceding candidate link section in which the difference in the average speed of the probe vehicle in the exit direction among the at least one candidate link section does not exceed the preset threshold value as the section in which to generate the divided link along a lane.

In addition, the processor 120 may determine whether the difference in the average speed of the probe vehicle in an exit direction among at least one candidate link section sequentially from the point at which the plurality of exit lanes advance exceeds the preset threshold value. When the difference in the average speed of the probe vehicle in the exit direction for all candidate link sections up to the last candidate link section exceeds the preset threshold value, the processor 120 may set a section from the point at which the plurality of exit lanes advance to the last candidate link section as the section in which to generate the divided link along a lane.

For example, the processor 120 may generate the link divided along a lane based on the section in which to generate the link divided according to the determined lane.

For example, the processor 120 may generate the link divided along a lane for the link in which to generate the link divided according to the determined lane, and generate a general link which is not divided according to a lane in a section which is not a section in which to generate a link divided along a lane.

Figure 2:
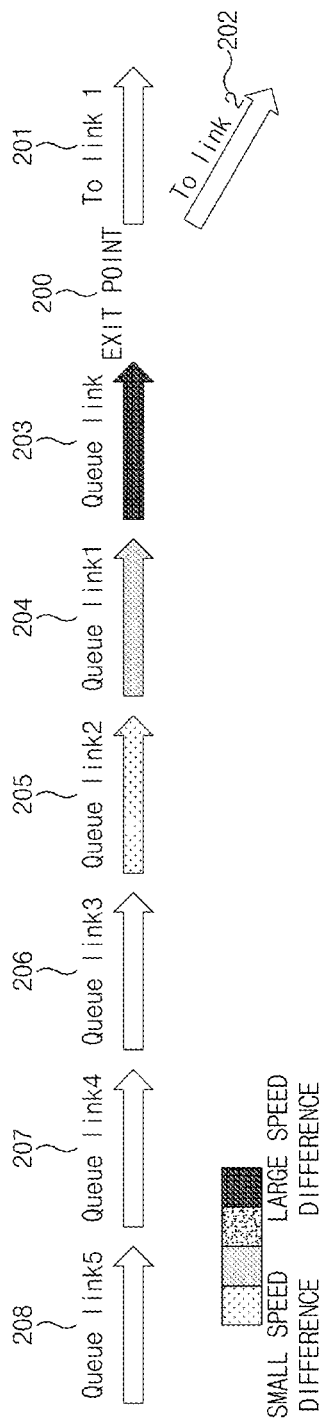
FIG. 2 is a diagram illustrating one or more candidate link sections sequentially connected in a direction opposite the direction of advancing to an exit lane according to an embodiment of the present disclosure.

FIG. 2 is a diagram illustrating one or more candidate link sections sequentially connected in a direction opposite the direction of advancing to an exit lane according to an embodiment of the present disclosure.

Referring to FIG. 2, it may be assumed that a road is connected to two exit lanes based on an exit point 200.

Links corresponding to the two exit lanes may be defined as To link 1 201 and To link 2 202.

A link advancing to two exit lanes may be defined as a From link 203.

Links sequentially connected to From link 203 in a travelling direction toward the exit point may be defined as Queue link 1 204, Queue link 2 205, Queue link 3 206, Queue link 4 207, and Queue link 5 208 in sequence.

Five queue links are exemplified, but a number of queue links other than five may be defined.

Based on whether the difference in the average speed of the probe vehicle in the exit direction for the section corresponding to From link 203, Queue link 1 204, Queue link 2 205, Queue link 3 206, Queue link 4 207, and Queue link 5 208 exceeds the preset threshold value, the apparatus 100 for generating a link for each lane may determine a section in which to generate the divided link along a lane.

For example, the apparatus 100 for generating a link for each lane may determine whether the difference in the average speed of the probe vehicle in the exit direction for the section corresponding to From link 203, Queue link 1 204, Queue link 2 205, Queue link 3 206, Queue link 4 207, and Queue link 5 208 in sequence exceeds the preset threshold value.

In the order of From link 203, Queue link 1 204, Queue link 2 205, Queue link 3 206, Queue link 4 207 and Queue link 5 208, as the distance increases from the exit point, the difference in the average speed of the probe vehicle in the exit direction may be reduced.

For example, the apparatus 100 for generating a link for each lane may determine whether the difference in the average speed of the probe vehicle in the exit direction for the section corresponding to From link 203, Queue link 1 204, Queue link 2 205, Queue link 3 206, Queue link 4 207, and Queue link 5 208 in sequence exceeds the preset threshold value. In addition, the apparatus 100 for generating a link for each lane may determine a section up to a section corresponding to an immediately preceding link of a link in which the difference between the average speed of the probe vehicle in the first exit direction from the exit point does not exceed the preset threshold value as a section in which to generate a link divided along a lane.

FIG. 3 is a diagram illustrating an example in which an apparatus for generating a link for each lane according to an embodiment of the present disclosure determines a section in which to generate a link divided along a lane.

For example, the apparatus 100 for generating a link for each lane may obtain the speed of the probe vehicle, which travels on the road in the direction from Acheon IC to the Gayang Bridge junction, from the probe vehicle.

An exit lane may be divided from a northern end point of the Seongsu Bridge. The from link advancing an exit lane may have a unique number of 2046547, and the length may be 133 m.

The exit lane divided at the northern end point of Seongsu Bridge may include a main road corresponding to a to link having a unique number of 2053738 and an exit lane corresponding to a to link having a unique number of 2053898.

A section from the exit point to 133 m may be defined as from link.

A section from the exit point to 311 m connected to the from link may be defined as queue link 1.

A section from the exit point to 646 m connected to queue link 1 may be defined as queue link 2.

A section from the exit point to 1455 m connected to queue link 2 may be defined as queue link 3.

A section from the exit point to 1604 m connected to queue link 3 may be defined as queue link 4.

A section from the exit point to 1652 m connected to queue link 4 may be defined as queue link 5.

A section from the exit point to 1905 m connected to queue link 5 may be defined as queue link 6.

A section from the exit point to 2030 m connected to queue link 6 may be defined as queue link 7.

A section from the exit point to 2461 m connected to queue link 7 may be defined as queue link 8.

A section from the exit point to 4081 m connected to queue link 8 may be defined as queue link 9.

A section from the exit point to 4398 m connected to queue link 9 may be defined as queue link 10.

For example, the apparatus 100 for generating a link for each lane may acquire the speed of the probe vehicle at Feb. 25, 2020, 8:45.

The average speed of the probe vehicle advancing to the main road for the obtained from link may be 43.38 km/h, the average speed of the probe vehicle advancing to the exit lane may be 25.24 km/h, and the speed difference may be 18.23 km/h.

The average speed of the probe vehicle advancing to the main road for queue link 1 may be 48.31 km/h, the average speed of the probe vehicle advancing to the exit lane may be 12.90 km/h, and the speed difference may be 35.40 km/h.

The average speed of the probe vehicle advancing to the main road for queue link 2 may be 57.68 km/h, the average speed of the probe vehicle advancing to the exit lane may be 41.33 km/h, and the speed difference may be 16.35 km/h.

The average speed of the probe vehicle advancing to the main road for queue link 3 may be 48.45 km/h, the average speed of the probe vehicle advancing to the exit lane may be 33.55 km/h, and the speed difference may be 14.91 km/h.

The average speed of the probe vehicle advancing to the main road for queue link 4 may be 48.24 km/h, the average speed of the probe vehicle advancing to the exit lane is 23.61 km/h, and the speed difference may be 24.64 km/h.

The information on the average speed of the probe vehicle advancing to the main road for queue link 5 is filtered, and the average speed of the probe vehicle advancing to the exit lane may be 40.50 km/h.

The information on the average speed of the probe vehicle advancing to the main road for queue link 6 may be filtered, and the average speed of the probe vehicle advancing to the exit lane may be 58.63 km/h.

The average speed of the probe vehicle advancing to the main road for queue link 7 may be 53.99 km/h, the average speed of the probe vehicle advancing to the exit lane may be 52.29 km/h, and the speed difference may be 1.70 km/h.

The average speed of the probe vehicle advancing to the main road for queue link 8 may be 45.05 km/h, the average speed of the probe vehicle advancing to the exit lane may be 35.70 km/h, and the speed difference may be 9.35 km/h.

The average speed of the probe vehicle advancing to the main road for queue link 9 may be 25.93 km/h, the average speed of the probe vehicle advancing to the exit lane may be 22.58 km/h, and the speed difference may be 3.35 km/h.

The average speed of the probe vehicle advancing to the main road for queue link 10 may be 10.78 km/h, the average speed of the probe vehicle advancing to the exit lane may be 10.20 km/h, and the speed difference may be 0.58 km/h.

As an example, the apparatus 100 for generating a link for each lane may include a link corresponding to the case where the average speed of the probe vehicle in at least one exit direction is less than 60 km/h in the exit direction, sequentially from the entry point, according to the hourly data sample, the number of pieces of the obtained information on the speed of the probe vehicle in the exit direction is 5 or more, and the difference in the average speed of the probe vehicle in the exit direction is 10 km/h or more, in a set for generating a link divided along a lane.

The number of data samples in which the number of links included in the set is 0 may be 3162. The number of data samples in which the number of links included in the set is 1 may be 127. The number of data samples in which the number of links included in the set is 2 may be 97. The number of data samples in which the number of links included in the set is 3 may be 57. The number of data samples in which the number of links included in the set is 4 may be 11. The number of data samples in which the number of links included in the set is 5 may be 2.

In this case, there is a data sample having a maximum of 5 links included in the set, so that the section in which five links are connected from an exit point to 1604 m may be determined as a section in which to generate a link divided along a lane.

FIG. 4 is a diagram illustrating another example in which an apparatus for generating a link for each lane according to an embodiment of the present disclosure determines a section in which to generate a link divided along a lane.

For example, the apparatus 100 for generating a link for each lane may obtain the speed of the probe vehicle, which travels on the road in the direction from Gae-hwa IC to Gang-il IC.

An exit lane may be divided at a southern end point of the Olympic Bridge. The from link advancing to the exit lane may have a unique number of 3808936, and the length may be 268 m.

The exit lane divided at the southern end of the Olympic Bridge may include a main road corresponding to a to link having a unique number of 3808935 and an exit lane corresponding to a to link having a unique number of 4028900.

A section from the exit point to 268 m may be defined as from link.

A section from the exit point to 440 m connected to the from link may be defined as queue link 1.

A section from the exit point to 559 m connected to queue link 1 may be defined as queue link 2.

A section from the exit point to 783 m connected to queue link 2 may be defined as queue link 3.

A section from the exit point to 872 m connected to queue link 3 may be defined as queue link 4.

A section from the exit point to 926 m connected to queue link 4 may be defined as queue link 5.

A section from the exit point to 1224 m connected to queue link 5 may be defined as queue link 6.

A section from the exit point to 1750 m connected to queue link 6 may be defined as queue link 7.

A section from the exit point to 2292 m connected to queue link 7 may be defined as queue link 8.

A section from the exit point to 2670 m connected to queue link 8 may be defined as queue link 9.

A section from the exit point to 3063 m connected to queue link 9 may be defined as queue link 10.

For example, the apparatus 100 for generating a link for each lane may acquire the speed of the probe vehicle at Feb. 24, 2020, 10:50.

The average speed of the probe vehicle advancing to the main road for the obtained from link may be 56.52 km/h, the average speed of the probe vehicle advancing to the exit lane may be 39.90 km/h, and the speed difference may be 16.62 km/h.

The average speed of the probe vehicle advancing to the main road for queue link 1 may be 54.07 km/h, the average speed of the probe vehicle advancing to the exit lane may be 41.85 km/h, and the speed difference may be 12.22 km/h.

The average speed of the probe vehicle advancing to the main road for queue link 2 may be 57.98 km/h, the average speed of the probe vehicle advancing to the exit lane may be 54.05 km/h, and the speed difference may be 3.93 km/h.

The information on the average speed of the probe vehicle advancing to the main road for queue link 3 may be filtered, and the average speed of the probe vehicle advancing to the exit lane may be 55.98 km/h.

The information on the average speed of the probe vehicle advancing to the main road for queue link 4 may be filtered, and the information on the average speed of the probe vehicle advancing to the exit lane may be filtered.

The average speed of the probe vehicle advancing to the main road for queue link 5 may be 57.14 km/h, and the information on the average speed of the probe vehicle advancing to the exit lane may be filtered.

The information on the average speed of the probe vehicle advancing to the main road for queue link 6 may be filtered, and the information on the average speed of the probe vehicle advancing to the exit lane may be filtered.

The information on the average speed of the probe vehicle advancing to the main road for queue link 7 may be filtered, and the information on the average speed of the probe vehicle advancing to the exit lane may be filtered.

The information on the average speed of the probe vehicle advancing to the main road for queue link 8 may be filtered, and the information on the average speed of the probe vehicle advancing to the exit lane may be filtered.

The information on the average speed of the probe vehicle advancing to the main road for queue link 9 may be filtered, and the information on the average speed of the probe vehicle advancing to the exit lane may be filtered.

The information on the average speed of the probe vehicle advancing to the main road for queue link 10 may be filtered, and the information on the average speed of the probe vehicle advancing to the exit lane may be filtered.

As an example, the apparatus 100 for generating a link for each lane may include a link corresponding to the case where the average speed of the probe vehicle in at least one exit direction is less than 60 km/h in the exit direction, sequentially from the entry point, according to the hourly data sample, the number of pieces of the obtained information on the speed of the probe vehicle in the exit direction is 5 or more, and the difference in the average speed of the probe vehicle in the exit direction is 10 km/h or more, in a set for generating a link divided along a lane.

The number of data samples in which the number of links included in the set is 0 may be 3442. The number of data samples in which the number of links included in the set is 1 may be 11. The number of data samples in which the number of links included in the set is 2 may be 4. The number of data samples in which the number of links included in the set is 3 may be 0 (zero). The number of data samples in which the number of links included in the set is 4 may be 0 (zero). The number of data samples in which the number of links included in the set is 5 may be 0 (zero).

In this case, there is a data sample having a maximum of 2 links included in the set, so that the section in which two links are connected from an exit point to 440 m may be determined as a section in which to generate a link divided along a lane.

Figure 5:
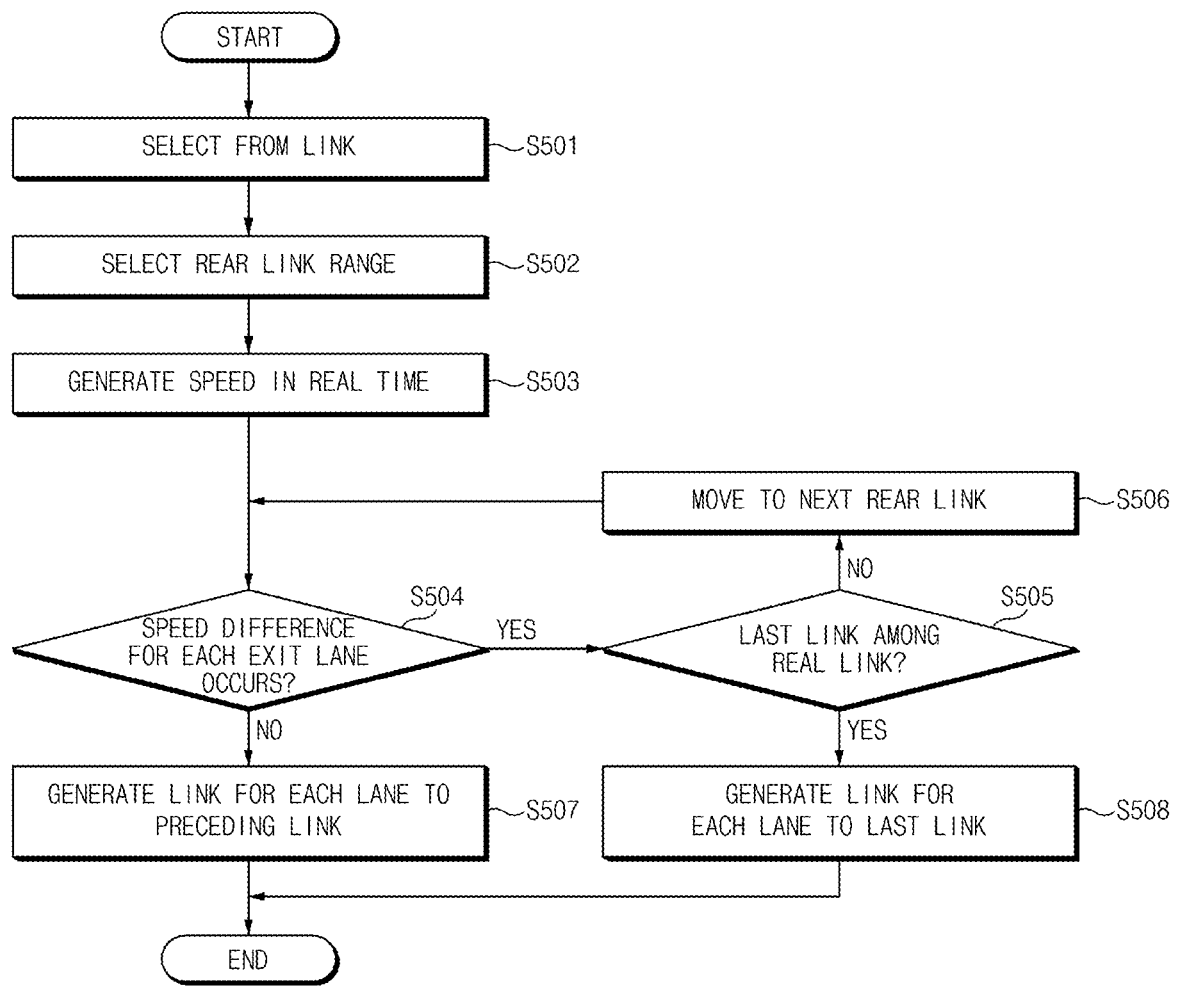
FIG. 5 is a flowchart illustrating a process of determining a section in which to generate a link divided along a lane by an apparatus for generating a link for each lane according to an embodiment of the present disclosure.

FIG. 5 is a flowchart illustrating a process of determining a section in which to generate a link divided along a lane by an apparatus for generating a link for each lane according to an embodiment of the present disclosure.

Referring to FIG. 5, in S501, the apparatus 100 for generating a link for each lane may select a From link.

For example, the apparatus 100 for generating a link for each lane may select a link from the exit point to the exit lane as the From link.

For example, the apparatus 100 for generating a link for each lane may select the From link as an initial confirmation link.

In S502, the apparatus 100 for generating a link for each lane may select a rear link range after selecting the From link in S501.

For example, the apparatus 100 for generating a link for each lane may select a link in a range connected by a preset number in the direction opposite the direction of traveling in the exit point direction and advancing to the From link as the rear link.

After selecting the rear link range S502, in S503, the apparatus 100 for generating a link for each lane may generate the speed of the probe vehicle in the exit direction in real time for each link.

For example, the apparatus 100 for generating a link for each lane may obtain information on the speed of the probe vehicle from the probe vehicle, and calculate the average speed of the probe vehicle in the exit direction in real time for each link.

After generating the speed of the probe vehicle in the exit direction in real time for each link in S503, in S504, the apparatus 100 for generating a link for each lane may determine whether a speed difference for each exit lane occurs with respect to a check link.

For example, the apparatus 100 for generating a link for each lane may determine whether the speed difference for each exit lane for the check link exceeds a preset threshold value.

After determining whether the speed difference for each exit lane occurs with respect to the check link in S504, in S507, the apparatus 100 for generating a link for each lane may generate a link for each lane to the link immediately preceding the check link when it is determined that the speed difference for each exit lane does not occur with respect to the check link.

As an example, the apparatus 100 for generating a link for each lane may determine the section from the exit point to the link immediately preceding the check link as the section in which to generate a link for each lane, and may generate the link for each lane for the determined section.

After determining whether the speed difference for each exit lane occurs with respect to the check link in S504, when it is determined that the speed difference for each exit lane occurs with respect to the check link, in S505, the apparatus 100 for generating a link for each lane may determine whether the check link is the last of the rear links.

For example, the apparatus 100 for generating a link for each lane may determine whether the check link is the last link in the direction opposite the direction toward the exit lane among the rear links.

After determining whether the check link is the last link in the direction opposite the direction toward the exit lane among the rear links in S505, in S508, the apparatus 100 for generating a link for each lane may generate a link for each lane to the last link when it is determined that the check link is the last link in the direction opposite the direction toward the exit lane among the rear links.

As an example, the apparatus 100 for generating a link for each lane may determine the section from the exit point to the last link as a section in which to generate a link for each lane, and may generate a link for each lane for the determined section.

After determining whether the check link is the last link among the rear links in S505, in S506, the apparatus 100 for generating a link for each lane may move the check link to the next rear link when it is determined that the check link is not the last link among the rear links.

As an example, when it is determined that the check link is not the last link among the rear links, the apparatus 100 for generating a link for each lane may select the existing check link and the rear link connected in the opposite direction to the direction toward the exit lane as a new check link.

After moving to the next rear link in S506, the apparatus 100 for generating a link for each lane may return to S504 to determine whether the speed difference for each exit lane occurs with respect to the check link.

Figure 6:
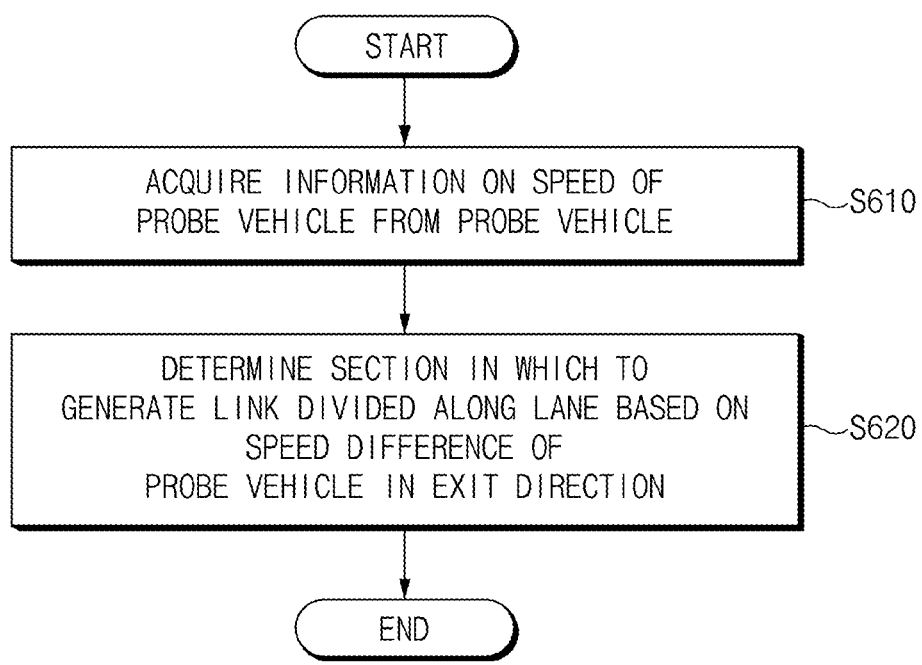
FIG. 6 is a flowchart illustrating a method of generating a link for each lane according to an embodiment of the present disclosure.

FIG. 6 is a flowchart illustrating a method of generating a link for each lane according to an embodiment of the present disclosure.

Referring to FIG. 6, a method of generating a link for each lane may include acquiring information about a speed of a probe vehicle from the probe vehicle in S610, and determining a section for generating a divided link along a lane based on a speed difference of the probe vehicle in an exit direction in S620.

The acquiring of the information about the speed of the probe vehicle from the probe vehicle in S610 may be performed by the information acquisition device 110.

As an example, the method of generating a link for each lane may further include acquiring, by the information acquisition device 110, an ID of the probe vehicle.

As an example, the method of generating a link for each lane may further include classifying, by the processor 120, the exit direction of the probe vehicle based on the ID of the probe vehicle.

The determining of the section for generating the divided link along the lane based on the speed difference of the probe vehicle in the exit direction in S620 may be performed by the processor 120.

As an example, the determining of the section for generating the divided link along the lane in S620 may include determining, by the processor 120, the section for generating the divided link according to the lane based on whether the speed difference of the probe vehicle in the exit direction exceeds a preset threshold value.

For example, the determining of the section for generating the divided link in S620 may include determining, by the processor 120, a lane section for generating a link for each lane in consideration of whether a number of acquired information about the speed of the probe vehicle exceeds a preset threshold number.

For example, the determining of the section for generating the divided link in S620 may include determining, by the processor 120, a lane section for generating a link for each lane based on whether the speed of the probe vehicle is less than a preset threshold speed.

For example, the determining of the section for generating the divided link in S620 may include determining, by the processor 120, a section included in the section for generating the divided link according to the lane among one or more candidate link sections sequentially connected in a direction opposite a direction of advancing to an exit lane based on a point that enters into a plurality of exit lanes, based on the speed difference of the probe vehicle in the exit direction with respect to each of the candidate link sections.

For example, the determining of the section included in the section for generating a link along a lane by the processor may include filtering, by the processor 120, the candidate link sections, in which a number of acquired information about the speed of the probe vehicle in the exit direction does not exceed a preset threshold number, from the one or more candidate link sections.

For example, the determining of the section included in the section for generating a link along a lane by the processor may include filtering, by the processor 120, the candidate link sections in which an average speed of the probe vehicle in all exit directions is greater than or equal to a preset threshold speed, from the one or more candidate link sections.

For example, the determining of the section included in the section for generating a link along a lane by the processor may include determining, by the processor 120, a section included in the section for generating the divided link along the lane based on whether a difference in an average speed of the probe vehicle in the exit direction among the one or more candidate link sections exceeds a preset threshold value.

For example, the determining of the section included in the section for generating a link along a lane by the processor may include allowing, by the processor 1200, a candidate link section, in which a difference in average speed of the probe vehicle in the exit direction among the one or more candidate link sections sequentially from a point at which a plurality of exit routes advance exceeds a preset threshold value, to be included in the section for generating the divided link along the lane.

Accordingly, the processes of the method or algorithm described in relation to the embodiments of the present disclosure may be implemented directly by hardware executed by the processor, a software module, or a combination thereof. The software module may reside in a storage medium (that is, the memory and/or the storage), such as a RAM, a flash memory, a ROM, an EPROM, an EEPROM, a register, a hard disk, solid state drive (SSD), a detachable disk, or a CD-ROM.

The exemplary storage medium is coupled to the processor, and the processor may read information from the storage medium and may write information in the storage medium. In another method, the storage medium may be integrated with the processor. The processor and the storage medium may reside in an application specific integrated circuit (ASIC). The ASIC may reside in a user terminal. In another method, the processor and the storage medium may reside in the user terminal as an individual component.

The effects of an apparatus and method for generating a link for each lane according to the present disclosure will be described as follows.

According to at least one of the embodiments of the present disclosure, it is possible to provide an apparatus and method for generating a link for each lane when there is a plurality of exit lanes.

In addition, according to at least one of the embodiments of the present disclosure, it is possible to provide an apparatus and method for generating a link for each lane capable of improving the accuracy and reliability of the speed of each lane.

In addition, according to at least one of the embodiments of the present disclosure, it is possible to provide an apparatus and method for generating a link for each lane capable of solving a problem that the speed of each lane cannot be properly reflected when the conventional link for each lane is shorter than the actual vehicle queue.

In addition, according to at least one of the embodiments of the present disclosure, it is possible to provide an apparatus and method for generating a link for each lane capable of improving the quality of the expected arrival time of a destination by improving the accuracy and reliability of vehicle speed collected on the road.

In addition, according to at least one of the embodiments of the present disclosure, it is possible to provide an apparatus and method for generating a link for each lane capable of collectively and automatically generating a link for each lane reflecting a road shape.

In addition, various effects that are directly or indirectly understood through the present disclosure may be provided.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for generating a link for each lane, the apparatus comprising:
   an information acquisition device configured to acquire information about a speed of a probe vehicle from the probe vehicle; and
   a processor configured to determine a section for generating a divided link along a lane, based on a speed difference of the probe vehicle in an exit direction.

2. The apparatus of claim 1, wherein the information acquisition device is configured to acquire an ID of the probe vehicle, and
   wherein the processor is configured to classify the exit direction of the probe vehicle based on the ID of the probe vehicle.

3. The apparatus of claim 1, wherein the processor is configured to determine the section based on whether the speed difference of the probe vehicle in the exit direction exceeds a preset threshold value.

4. The apparatus of claim 1, wherein the processor is configured to determine a lane section for generating a link for each lane in consideration of whether a number of acquired information about the speed of the probe vehicle exceeds a preset threshold number.

5. The apparatus of claim 1, wherein the processor is configured to determine a lane section for generating a link for each lane, based on whether the speed of the probe vehicle is less than a preset threshold speed.

6. The apparatus of claim 1, wherein the processor is configured to determine a first section included in the section among one or more candidate link sections sequentially connected in a direction opposite a direction of advancing to an exit lane based on a point that enters a plurality of exit lanes, based on the speed difference of the probe vehicle in the exit direction with respect to each of the candidate link sections.

7. The apparatus of claim 6, wherein the processor is configured to filter candidate link sections, in which a number of acquired information about the speed of the probe vehicle in the exit direction does not exceed a preset threshold number, from the one or more candidate link sections.

8. The apparatus of claim 6, wherein the processor is configured to filter candidate link sections, in which an average speed of the probe vehicle in all exit directions is greater than or equal to a preset threshold speed, from the one or more candidate link sections.

9. The apparatus of claim 6, wherein the processor is configured to determine the first section, based on whether a difference in an average speed of the probe vehicle in the exit direction among the one or more candidate link sections exceeds a preset threshold value.

10. The apparatus of claim 6, wherein the processor is configured to allow a candidate link section, in which a difference in an average speed of the probe vehicle in the exit direction among the one or more candidate link sections exceeds a preset threshold value, to be included in the section.

11. A method of generating a link for each lane, the method comprising:
    acquiring, by an information acquisition device, information about a speed of a probe vehicle from the probe vehicle; and determining, by a processor, a section for generating a divided link along a lane based on a speed difference of the probe vehicle in an exit direction.

12. The method of claim 11, further comprising:
acquiring, by the information acquisition device, an ID of the probe vehicle, and
classifying, by the processor, the exit direction of the probe vehicle based on the ID of the probe vehicle.

13. The method of claim 11, wherein the determining of the section by the processor includes:
determining, by the processor, the section, based on whether the speed difference of the probe vehicle in the exit direction exceeds a preset threshold value.

14. The method of claim 11, wherein the determining of the section by the processor includes:
determining, by the processor, a lane section for generating a link for each lane in consideration of whether a number of acquired information about the speed of the probe vehicle exceeds a preset threshold number.

15. The method of claim 11, wherein the determining of the section by the processor includes:
determining, by the processor, a lane section for generating a link for each lane, based on whether the speed of the probe vehicle is less than a preset threshold speed.

16. The method of claim 11, wherein the determining of the section by the processor includes:
determining, by the processor, a first section included in the section among one or more candidate link sections sequentially connected in a direction opposite a direction of advancing to an exit lane based on a point that enters a plurality of exit lanes, based on the speed difference of the probe vehicle in the exit direction with respect to each of the candidate link sections.

17. The method of claim 16, wherein the determining of the section by the processor includes:
filtering, by the processor, candidate link sections, in which a number of acquired information about the speed of the probe vehicle in the exit direction does not exceed a preset threshold number, from the one or more candidate link sections.

18. The method of claim 16, wherein the determining of the section by the processor includes:
filtering, by the processor, candidate link sections, in which an average speed of the probe vehicle in all exit directions is greater than or equal to a preset threshold speed, from the one or more candidate link sections.

19. The method of claim 16, wherein the determining of the section by the processor includes:
determining, by the processor, the first section, based on whether a difference in an average speed of the probe vehicle in the exit direction among the one or more candidate link sections exceeds a preset threshold value.

20. The method of claim 16, wherein the determining of the section by the processor includes:
allowing, by the processor, a candidate link section, in which a difference in an average speed of the probe vehicle in the exit direction among the one or more candidate link sections exceeds a preset threshold value, to be included in the section.

* * * * *